Patented Feb. 14, 1950

2,497,176

UNITED STATES PATENT OFFICE 2,497,176

HYDROGENATION CATALYST

Ralph Burgess Mason, Baton Rouge, La., assignor to Standard Oil Development Company, a corporation of Delaware No Drawing. Application June 12, 1946, Serial No. 676,353

4 Claims. (Cl. 196—53)

The present invention is concerned with an improved catalyst. The invention is more particularly concerned with an improved hydrogenation catalyst which comprises sulfides of group VIII metals of the periodic table together with promoters selected from the oxides of metals of group IV of the periodic table. When utilizing the improved catalyst of the present invention, it is possible to hydrogenate unsaturated petroleum hydrocarbons particularly high molecular weight olefinic hydrocarbons with a minimum depolymerization and cracking of the feed stock. It is also possible when utilizing the improved catalyst of the present invention to hydrogenate feed stocks of the character described in the presence of sulfur without incurring any substantial deactivation of the catalyst.

It is well known in the art to hydrogenate oils as for example petroleum oils using a wide range of temperature and pressure conditions in the presence of various catalysts. The operating conditions depend upon, among other factors, the character of the feed, and the type of hydrogenated products desired. Pressures employed vary in the range from about atmospheric pressure to 300 atmospheres and higher. Temperatures likewise vary widely depending upon other operating conditions. For example temperatures may vary in the range from 200 to 800° F. The feed rates used will depend upon the character of the feed being hydrogenated, the type of products desired, the temperatures employed and the pressures utilized. In general, however, the feed rates are from 0.25 volume of oil per volume of catalyst to 2.0 volumes of oil per volume of catalyst per hour.

The particular catalysts employed likewise have varied considerably. For example it has been suggested that a catalyst such as molybdenum sulfide or a mixture of nickel and tungsten sulfides be employed. Many other catalysts have been suggested and employed. However, when utilizing catalyst previously known, entirely satisfactory hydrogenation results have not been secured, particularly when hydrogenating a relatively high molecular weight feed stock. These relatively high molecular weight feed stocks, such as those having molecular weights in the range from 140 and higher tend to depolymerize and crack in the presence of known catalysts, under the temperature and pressure conditions employed in the hydrogenation reaction.

I have now discovered a catalyst which may be readily employed for the hydrogenation of relatively high molecular weight feed stock without securing any appreciable depolymerization or cracking of the stock. In accordance with my invention I employ a catalyst selected from the sulfides of the metals of group VIII and use these sulfides in conjunction with a promoter selected from the oxides of group IV.

The preferred sulfides comprise sulfides of metals of the iron group as for example, iron sulfide, nickel sulfide, and cobalt sulfide. However, sulfides of other metals of group VIII as for example, ruthenium, rhodium, palladium, osmium, iridium, platinum, and plutonium are also effective. These sulfides may be supported on suitable carriers as for example, aluminum oxide, silica gel, kieselguhr, activated charcoal, pumice, porcelain and Portland cement agglomerates. The preferred promoters are oxides of thorium, zirconium, and titanium.

The amount of metal sulfide employed may vary widely, as for example, in the range from about 10% to about 90%. However, in general it is preferred that the amount of sulfide utilized be in the range from about 40% to about 90%. The amount of promoter utilized may likewise vary appreciably but, in general, it is preferred that the amount of promoter used in conjunction with the metal sulfide be in the range from about 0.5% to about 15%.

The catalysts may be prepared by various methods. For example, a mixed solution of soluble salts of the active component and promoter may be impregnated on the support. The catalyst is heated at a temperature in the range from about 700° F. to about 1000° F. to obtain oxides of the group VIII metals which are later activated in the presence of a sulfur containing gas to form the sulfide of the group VIII metal. Any soluble salt may be used for the impregnation, but because of ease of decomposition acetates and nitrates are preferred. If salts other than these which can be decomposed by heat are used for the impregnation, the active component and promoter impregnated on the support are treated with an alkaline carbonate or with ammonia and the undesirable anion is removed by washing. The catalyst is dried and activated with a sulfur containing gas in the usual manner.

Since impregnation methods usually limit the amount of active material in the catalyst, a preferred method consists of coprecipitating the active component and the promoter in the presence of the finely divided support. The catalyst is then washed and dried. The activation is effected by heating in the presence of a sulfur containing gas at a temperature in the range from about 500° F. to 1000° F.

As pointed out heretofore, the catalyst of the present invention may be utilized in the hydrogenation of any type oil. However, it is particularly adapted for the hydrogenation of high molecular weight petroleum oils which when hydrogenated with known catalysts tend to depolymerize and crack under the temperature and pressure conditions employed. My catalyst is particularly adapted for hydrogenating oils having API gravities in the range from 35 to 60 and molecular weights in the range from 140 to 252. It is particularly adapted to the hydrogenation of olefinic type oils. For example, I have found that when I hydrogenate petroleum oils comprising compounds such as tri-isobutylene, tetra-isobutylene and hexa propylene, unexpected desirable results are obtained in that there is a minimum depolymerization and cracking of the feed oil being hydrogenated. Feed oils which yield upon hydrogenation high quality, high flash aviation gasolines known as safety fuels, by nature of their preparation usually contain sulfur. My catalysts are particularly adapted for hydrogenating these sulfur containing feed oils.

The catalysts of my invention can be used over a temperature range varying from about 200° F. to about 800° F. and at pressures ranging from about 500 to about 6000 pounds per square inch gauge. The preferred conditions, however, are temperatures from about 450° F. to about 550° F. and pressures ranging from about 2000 to 3000 pounds per square inch gauge. Feed rates as compared to the catalyst as varied from about 0.25 to 2.0 volumes of feed oil per volume of catalyst per hour. The preferred fresh feed oil is in the range from about 0.5 to 1.0 v./v./hr. with hydrogen rates from about 8000 to 10,000 cubic feet per barrel of oil feed. The hydrogen rates, however, may be varied from about 2000 to about 20,000 cubic feet per barrel of oil feed.

The process of my invention may be readily understood by the following example which is given for the purpose of illustrating the same.

*Example*

An active catalyst was prepared as follows: A nickel-thorium carbonate was coprecipitated upon a wet mass of freshly precipitated and washed aluminum hydroxide. The mass was dried and pilled into $\frac{3}{16}$" pellets. The catalyst was activated by first heating in an atmosphere of nitrogen and then by addition of a mixed nitrogen-hydrogen sulfide stream whereby the nickel was converted to nickel sulfide. The calculated percentage of alumina ($Al_2O_3$), nickel, and thorium oxide before activation was 53, 42.8 and 4.2% respectively.

The advantages of this catalyst over a conventional sulfided nickel-kieselguhr catalyst in the hydrogenation of tri-isobutylene feed are shown by the following data.

| Catalyst | Sulfided Ni, $Al_2O_3$, $ThO_2$ | | | | Sulfided Ni-Kieselguhr | | | |
|---|---|---|---|---|---|---|---|---|
| Per Cent Ni (Unsulfided Cat.) | 42.8 | | | | 55 | | | |
| Feed | Tri-isobutylene | | | | | | | |
| Hours of Run | 6 | | | | 12 | | | |
| Temperature, °F | 500 | | | | 500 | | | |
| Pressure, P. s. i. g | 2,600 | | | | 2,600 | | | |

| Inspections | Feed | | Product | | Feed | | Product | |
|---|---|---|---|---|---|---|---|---|
| | Grav. °API | Br. No. | Grav. °API | Br. No. | Grav. °API | Br. No. | Grav. °API | Br. No. |
| | 53 | 96 | | | 53 | 96 | | |
| Hour 1 | | | 59.8 | 44 | | | 61.9 | 44 |
| Hour 4 | | | 61.2 | 2 | | | 64.2 | 5.0 |
| Hour 6 | | | 61.2 | 0 | | | 64.3 | 0.4 |
| Hour 12 | | | | | | | 70.3 | 0 |

The more rapid reduction in bromine number accompanied with lower increase in API gravity indicates the nickel sulfide alumina, thoria catalyst is a more active catalyst possessing less depolymerization and cracking properties.

In the preparation of my catalyst, other metals of the iron group may be employed. Also it is preferred to coprecipitate the group VIII and the group IV metals from solution with an alkaline material and to control the alkali content by water washing. Retardation of the cracking and depolymerization characteristics of the catalyst is secured by controlling the alkali content in the range from about 0–5% of the catalyst composition.

What I claim is:

1. Improved process for the hydrogenation of unsaturated high molecular weight petroleum hydrocarbons containing sulfur which comprises contacting said high molecular weight hydrocarbons under non-destructive hydrogenation conditions with a catalyst consisting essentially of about 40–90% by weight of nickel sulfide promoted with a minor promotional amount of thoria amounting to about 0.5–15% by weight of the catalyst, the balance amounting to a substantial proportion of the catalyst being alumina, whereby the feed oil is hydrogenated to saturated hydrocarbons and no substantial depolymerization and cracking results.

2. Improved process for the hydrogenation of unsaturated high molecular weight hydrocarbons which comprises contacting said high molecular weight hydrocarbons under non-destructive hydrogenation conditions with a catalyst consisting essentially of about 53% by weight of alumina, 48.2% by weight of nickel sulfide (calculated as Ni), and 4.2% by weight of thorium oxide whereby hydrogenation to saturated hydrocarbons but substantially no depolymerization and cracking of the feed oil results.

3. Process in accordance with claim 2 in which the molecular weight of the feed stock is in the range from about 140 to 252 and comprises sulfur.

4. An improved hydrogenation catalyst consisting essentially of about 53% by weight of alumina, 42.8% by weight of nickel sulfide (calculated as Ni) and 4.2% by weight of thorium oxide.

RALPH BURGESS MASON.

REFERENCES CITED

The following references are of record in the file of this patent:

UNITED STATES PATENTS

| Number | Name | Date |
|---|---|---|
| 1,890,434 | Krauch et al. | Dec. 6, 1932 |
| 1,948,408 | Watts et al. | Feb. 20, 1934 |
| 1,996,009 | Krauch et al. | Mar. 26, 1935 |
| 2,127,383 | Pier et al. | Aug. 16, 1938 |
| 2,187,393 | De Simo | Jan. 16, 1940 |
| 2,206,376 | Vlugter | July 2, 1940 |
| 2,348,576 | Seguy | May 9, 1944 |
| 2,360,622 | Roetheli | Oct. 17, 1944 |
| 2,361,825 | Donmani | Oct. 31, 1944 |
| 2,379,410 | Bannerot et al. | July 3, 1945 |